United States Patent [19]

Wachholz

[11] Patent Number: 5,011,653

[45] Date of Patent: Apr. 30, 1991

[54] HIGH TEMPERATURE REACTOR UTILIZING A GRAPHITE REFLECTOR

[75] Inventor: Winfried Wachholz, Gorxheimertal, Fed. Rep. of Germany

[73] Assignee: Hochtemperatur-Reaktorbau GmbH, Mannheim, Fed. Rep. of Germany

[21] Appl. No.: 310,663

[22] Filed: Feb. 14, 1989

[30] Foreign Application Priority Data

Feb. 15, 1988 [DE] Fed. Rep. of Germany ....... 3804643

[51] Int. Cl.$^5$ ............................................. G21C 19/42
[52] U.S. Cl. .................................... 376/313; 376/220; 376/287; 376/310; 252/627; 252/630; 423/2
[58] Field of Search ............... 376/313, 310, 220, 287; 423/2; 252/630, 627

[56] References Cited

U.S. PATENT DOCUMENTS

| | | | |
|---|---|---|---|
| 4,167,444 | 9/1979 | Schweiger | 176/37 |
| 4,290,852 | 9/1981 | Fritz et al. | 176/58 |
| 4,459,261 | 7/1984 | Kolodzey et al. | 376/285 |
| 4,659,477 | 4/1987 | Macedo et al. | 210/679 |
| 4,664,871 | 5/1987 | Schoening | 376/219 |
| 4,675,155 | 6/1987 | Schoening | 376/458 |
| 4,695,561 | 9/1987 | Deitz | 502/401 |
| 4,777,012 | 10/1988 | Schöning et al. | 376/265 |
| 4,795,607 | 1/1989 | Reutler et al. | 376/299 |
| 4,842,810 | 6/1989 | Schoening et al. | 376/299 |

FOREIGN PATENT DOCUMENTS

3212266 4/1982 Fed. Rep. of Germany .
3245022 12/1982 Fed. Rep. of Germany .
3345113 12/1983 Fed. Rep. of Germany .

OTHER PUBLICATIONS

"Spaltproduktfreisetzung bei Kernschmelzen", Hassmann et al., Kerntechnische Gesellschaft e.V., 1987.

*Primary Examiner*—Brooks H. Hunt
*Assistant Examiner*—N. Bhat
*Attorney, Agent, or Firm*—Fulbright & Jaworski

[57] ABSTRACT

A gas cooled high temperature reactor with a core of preferably spherical fuel elements enclosed by a graphite roof and a side and bottom reflector. In order to minimize environmental contamination by fission products, even upon (hypothetical) core overheating accidents, the upper part of the roof reflector incorporates volatile iodine and cesium iodide, suitable metal atoms or molecules of the compounds of these metals bonded into the cracked binder material of the graphite. The dilution of the doping material must be high enough (from 1:100 to 1:10,000), so that the substances (for example alkaline earth metals or rare earths) are present as individual atoms or molecules. The iodine is chemically bound to the doping atoms, and iodide formed in this matter is retained in the cracked binder material. Molecules of high temperature oxides may also be incorporated.

15 Claims, No Drawings

HIGH TEMPERATURE REACTOR UTILIZING A GRAPHITE REFLECTOR

BACKGROUND OF THE INVENTION

1. Field of the Invention

The invention relates to a high temperature reactor with a core of preferably spherical fuel elements, more particularly to a reactor with an upward helium coolant flow through a core and with a graphite roof reflector, a side reflector, and bottom reflector, and forming a cylindrical cavity to receive the core.

2. Description of the Related Technology

DE-OS 32 45 022 (corresponding to U.S. Pat. No. 4,675,155) and 33 45 113 (corresponding to U.S. Pat. No. 4,664,871) and DE P 32 12 266, the disclosures of which are expressly incorporated by reference herein, show reactor installations with graphite reflectors.

SUMMARY OF THE INVENTION

An upward flow of the helium caused by natural convection will occur through a reactor core and through the roof reflector in case of a hypothetical core heating disturbance under all situations and pressure ranges. Recent experiments have shown that the nuclear fission product of cesium is retained in this process for a long period of time completely in the roof reflector. The experiments also indicate that the diffusion processes and chemical processes pass very rapidly into equilibrium states. As strontium and the metallic fission products are absorbed even better, the retention effect for these fission products is even more favorable. But these measurements also show that such a retention effect is much weaker in the case of iodine and cesium iodide.

The absorption of iodine on a chemical element or a chemical compound by a simple reaction within the roof reflector apparently cannot be attained. All iodine compounds, in particular iodides, are excessively volatile in the temperature range of 1000 to 1200 degrees C. This temperature range corresponds to the accident temperature of the roof reflector. It must also be taken into account that most iodine compounds in the temperature range are already displaying decomposition phenomena, which do not permit the obtention of the low partial pressure desired for the absorption of iodine.

It is therefore an object of the invention to further reduce the contamination of the environment by fission products in a high temperature spherical fuel element reactor with upward coolant flow even in core heating disturbance events, and thus limit the damage as much as possible.

According to the invention, this object is attained by utilization of a roof reflector in the upper part of which exhibits metal atoms or molecules suitable for bonding volatile iodine and cesium iodide or molecules of compounds of these metals, built individually, dissolved in a high dilution in the cracked binder material of the graphite.

DESCRIPTION OF THE PREFERRED EMBODIMENT

Investigations confirmed that the retention of iodine and cesium iodide is also possible if the material of the upper roof reflector, in particular the cracked binder materials, is doped with certain metal atoms or their compounds. Metal atoms, the iodides of which have a relatively low volatility are used in the process. According to empirical experience, it is possible to bond even the inherently volatile cesium iodide formed by the fission products. By the fact that cesium is deposited in a known manner in the cracked binder material and the iodine simultaneously bound by the doping atoms, cesium iodide is initially decomposed by dissociation at elevated temperatures and then its two components are individually deposited.

The high temperature reactor according to the invention is thus characterized by a greatly improved and inherent retention effect for iodine and cesium iodide, combined with the advantage that a reduction of environmental contaminations may be obtained without the installation of additional filters for the case of accidents.

Alkaline earth metals and/or metals of the rare earths are suitable as the metal atoms for the proposed incorporation. In particular, oxides and carbides of barium and/or lanthanum may be used. The aforementioned substances must be present in a dilution of 1:100 to 1:10,000 in the cracked binder material; they are dissolved in said binder material. The high dilution is required so that the atoms of molecules incorporated would be present individually and are able to bind free iodine. Under these conditions, the iodine is not only bound chemically to the doping atoms or molecules, but the iodide formed in this manner is also retained additionally in the matrix of the cracked binder material.

The initial materials for the incorporation may include alcoholates or metallic salts of the metals involved. In the first case, for example in the preparation of the doped roof reflector graphite Ba $(C_3H_5)_2$ or La $(C_2H_5)_3$ are added to the liquid binder material. Following the cracking of the binder material for the production of the graphite, the doping atoms are present in the form of individual, finely distributed oxides. Metal salts of the cyclop stages, for example Ba $(C_5H_5)_2$ and La $(C_5H_5)_3$, may be used if introduction of doping atoms in the form of carbides in the binder material is desired (second case). In preparation of the graphite the mixture is cracked in the usual manner in the temperature range between 1500 degrees and 1800 degrees C. after the substances are mixed with the liquid binder material.

Under the conditions of an accident in a high temperature reactor, it may be assumed that in certain cases water vapor is present in the primary loop prior to the core heating. However, prior to the onset of the release of the fission products, this water vapor is practically completely converted; the partial pressure of the water vapor still present corresponds to the chemical equilibrium established by the reaction of steam and the hot graphite surfaces in a range of more than 1600 degrees C. The partial pressure of the water vapor is thus extremely low and the behavior of the fission products is therefore affected only slightly by this water vapor residue. The risk that the cracked binder material of the graphite may be slowly corroded by water vapor residues remains. In the process, the nuclei of the doping atoms may accumulate on the surfaces of the crystalline grains of the cracked binder material. In this case, the conversion of gaseous iodide would lead, although to a small extent only, by these doping atoms to the formation of iodides not structurally bound, thereby reducing the retention of the iodine, as the iodide formed would be partially volatile at the temperatures given.

In addition to the metals mentioned, molecules of the oxides of silicon, zirconium or titanium or other high temperature resistant oxides may be incorporated into the cracked binder material of the graphite in an advantageous further embodiment. The mixing ratio of these additional substances with the initiallY cited metals is within a range of 1:1 to 5:1.

If, now due to the presence of water vapor, the cracked binder material is partially gasified, in addition to the doping metal atoms or molecules, those of the additionally incorporated molecules are also released, for example silicon oxide molecules. These substances form compounds with each other, for example silicates, which practically cannot be attacked by iodine. This prevents the volatilization of the iodine by way of an iodide. If zirconium and titanium oxides are used, the doping atoms are molecules released form additional zirconate and titanate substances.

In the case of silicon dioxide, silicones may be used as the initial material for the additional substances. With oxides of titanium or zirconium, appropriately alcoholates of these metals are used as the initial materials. The silicones and/or alcoholates are added together with the initial materials for the doping atoms or molecules to the liquid binder material and the mixture cracked as described above, in the manner usual in the production of graphite.

I claim:

1. A high temperature reactor comprising a cylindrical core cavity defined by a graphite reflector exhibiting a roof reflector, a side reflector and a bottom reflector, wherein suitable metal atoms or molecules capable of bonding volatile iodine and cesium iodide are incorporated individually by compounds of said metals into an upper part of said roof reflector said suitable metals are highly diluted and dissolved in a cracked binder material of said roof reflector graphite, wherein said metal atoms or molecules are alkaline earth metals or rare earths.

2. A high temperature reactor according to claim 1, wherein said metals are oxides and carbides of barium or lanthanum.

3. A high temperature reactor according to claim 2, wherein alcoholates or metal salts of the metals involved are initial materials for incorporation into said graphite.

4. A high temperature reactor comprising a cylindrical core cavity defined by a graphite reflector exhibiting a roof reflector, a side reflector and a bottom reflector, wherein suitable metal atoms or molecules capable of bonding volatile iodine and cesium iodide are incorporated individually by compounds of said metals into an upper part of said roof reflector, said suitable metals are highly diluted and dissolved in a cracked binder material of said roof reflector graphite; and
supplemental substances of molecules of oxides of silicon, zirconium, titanium or other high temperature resistant oxides incorporated into said cracked binder material of the graphite, wherein a mixing ratio of said supplemental substances to said metals is within a range of 1:2 to 5:1.

5. A high temperature reactor according to claim 4, wherein silicones are initial materials for said supplemental substances.

6. A high temperature reactor according to claim 4, wherein alcoholates of said substances are used as initial materials for said supplemental substances.

7. A high temperature reactor comprising a cylindrical core cavity defined by a graphite reflector exhibiting a roof reflector, a side reflector and a bottom reflector, wherein suitable metal atoms or molecules capable of bonding volatile iodine and cesium iodide are incorporated individually by compounds of said metals into an upper part of said roof reflector, said suitable metals are highly diluted and dissolved in a cracked binder material of said roof reflector graphite; and
a core of spherical fuel elements arranged for upward helium coolant flow located within said cylindrical core cavity.

8. A method for reducing environmental fission product contamination of a high temperature nuclear reactor installation comprising the steps of:
incorporating metal atoms, molecules, or compounds suitable for bonding volatile iodine and cesium iodide into a reactor installation graphite roof reflector,
wherein the step of incorporating includes the step of dissolving said metals in a dilution in cracked binder material of said graphite roof reflector.

9. A method according to claim 8, wherein said metal atoms or molecules are alkaline earth metals, rare earths or oxides and carbides of barium or lanthanum.

10. A method according to claim 8, wherein initial materials for incorporation into said graphite are alcoholates or metal salts of the metals involved.

11. A method according to claim 8, wherein said step of incorporating further comprises incorporating supplemental substances of molecules of oxides of silicon, zirconium, titanium or other high temperature resistant oxides into said cracked binder material of the graphite, wherein a mixing ratio of said supplemental substances to said metals is within a range of 1:2 to 5:1.

12. A method according to claim 11, wherein silicones are initial materials for said supplemental substances.

13. A method according to claim 11, wherein alcoholates of said substances are used as initial materials for said supplemental substances.

14. A method for reducing environmental fission product contamination of a high temperature nuclear reactor installation comprising the steps of:
incorporating metal atoms, molecules or compounds into a nuclear reactor installation graphite roof reflector;
releasing iodine or cesium iodide molecules from reactor core fuel elements;
bonding said iodine or cesium iodide to said metals in said roof reflector;
wherein the step of incorporating includes dissolving said metals in dilution in cracked binder material of said graphite roof reflector.

15. A method according to claim 14 wherein said metals are in a 1:100 to 1:10,000 dilution in said cracked binder material.

* * * * *